United States Patent [19]

Schwartz et al.

[11] 4,382,113

[45] May 3, 1983

[54] METHOD FOR JOINING GRAPHITE TO GRAPHITE

[75] Inventors: Stephan Schwartz, Vaxholm; Olle Ramstrom, Akersberga; Åke Bjareklint, Vallentuna, all of Sweden

[73] Assignee: Energy Development Associates, Inc., Madison Heights, Mich.

[21] Appl. No.: 246,863

[22] Filed: Mar. 23, 1981

[51] Int. Cl.³ .................. B32B 9/00; H01M 4/00
[52] U.S. Cl. .................. 428/408; 29/623.4; 156/153; 156/273.9; 156/275.7; 156/283; 156/306.6; 429/209
[58] Field of Search .................. 29/623.4; 156/89, 153, 156/275, 306.6, 325, 283, 273.9, 275.7; 228/121, 195, 248, 258; 428/408; 429/209

[56] References Cited

U.S. PATENT DOCUMENTS

| | | | |
|---|---|---|---|
| 2,979,814 | 4/1961 | Steinberg | 428/408 |
| 3,193,424 | 7/1965 | Scott | 156/153 X |
| 3,239,403 | 3/1966 | Williams et al. | 156/275 |
| 3,679,534 | 7/1972 | Weinberg | 156/275 X |
| 3,813,301 | 5/1974 | Carr | 429/50 |
| 4,100,332 | 7/1978 | Carr | 429/27 |
| 4,264,668 | 4/1981 | Balla | 428/408 X |

FOREIGN PATENT DOCUMENTS

| | | |
|---|---|---|
| 841716 | 7/1960 | United Kingdom . |
| 865592 | 4/1961 | United Kingdom . |
| 894393 | 4/1962 | United Kingdom . |
| 937947 | 9/1963 | United Kingdom . |
| 1043819 | 9/1966 | United Kingdom . |
| 1109704 | 4/1968 | United Kingdom . |
| 1133309 | 11/1968 | United Kingdom . |
| 1162098 | 8/1969 | United Kingdom . |
| 1255913 | 12/1971 | United Kingdom . |
| 1360890 | 7/1974 | United Kingdom . |

Primary Examiner—Caleb Weston
Assistant Examiner—Robert A. Dawson
Attorney, Agent, or Firm—Harness, Dickey & Pierce

[57] ABSTRACT

A method of joining together a plurality of graphite members providing a low transition resistance is described. The method includes the steps of interposing a layer of a thermally sensitive material between the graphite members to be joined, applying pressure to force the graphite members together, applying sufficient heat to melt the thermally sensitive material, and releasing the pressure after providing a period of time for cooling. The thermally sensitive material is preferably composed from a thermoplastic material, and the heat for melting this material is preferably provided by resistance brazing.

17 Claims, 4 Drawing Figures

U.S. Patent
May 3, 1983
4,382,113
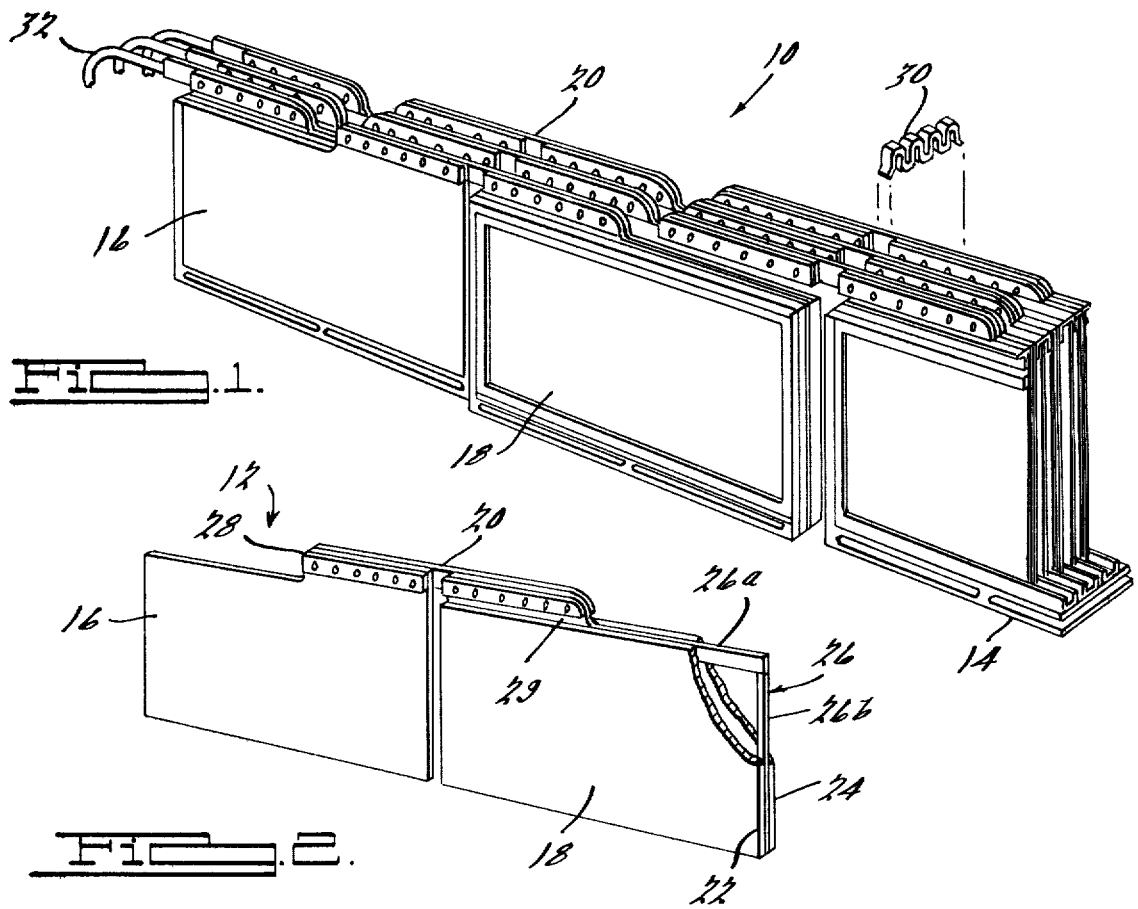
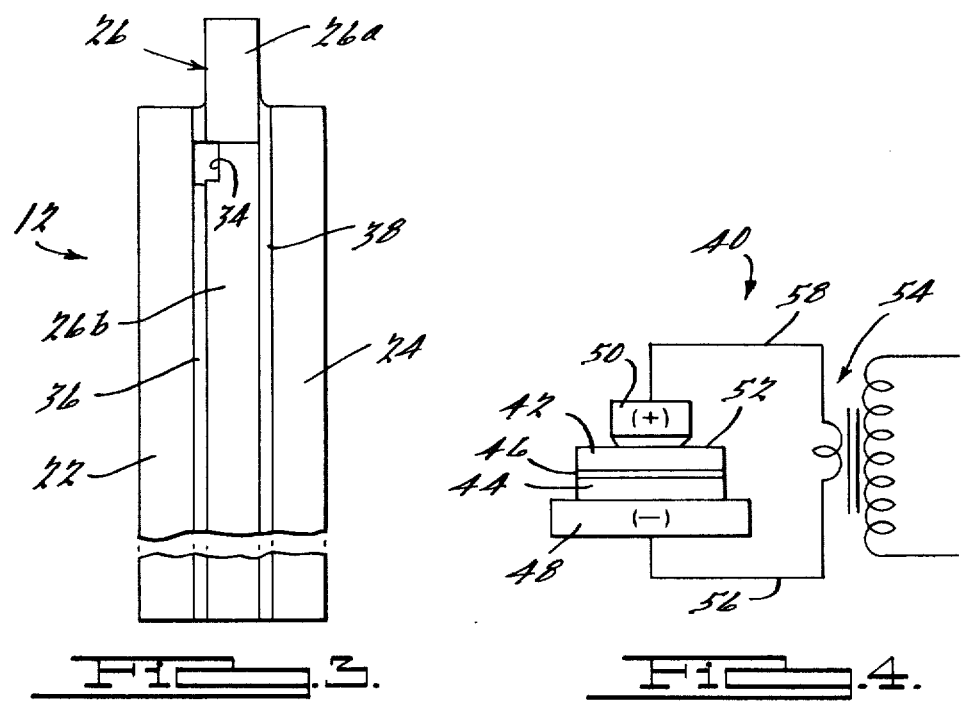

METHOD FOR JOINING GRAPHITE TO GRAPHITE

BACKGROUND AND SUMMARY OF THE INVENTION

The present invention relates generally to joining graphite to graphite, and particularly to bonding or resistance brazing a plurality of graphite members together with a thermally sensitive material.

Graphite is used in many industrial fields, including chemical, electrical, metallurgical, electrochemical, nuclear, and rocket fields. In several of these areas of manufacture, it is desirable to join graphite to graphite. In the field of electrochemistry, graphite is widely used as an electrode material due to its electrical and thermal characteristics, and because it is one of the most inert materials with respect to chemical reactions. In this particular application, it is important to achieve a low transition or contact resistance between the graphite members being joined in order to minimize voltaic losses.

One such electrochemical application is the zinc-chloride battery, where graphite is employed for both the positive and negative electrodes. During the charging of the battery, zinc metal is electrodeposited on the negative or zinc electrode and chlorine gas is generated at the positive or chlorine electrode from an aqueous zinc-chloride electrolyte. During the discharging of the battery, the reactions are reversed to generate electricity from the terminals of the battery. The zinc electrode is constructed from dense or fine grained graphite, and the chlorine electrode is constructed from a liquid permeable porous graphite.

Three techniques generally have been employed to join graphite electrodes or members together. Bolt connections have been used, but this approach increases the design complexity and results in an unnecessary loss of graphite material. A second technique has been set forth in U.S. Pat. No. 3,813,301 issued May 28, 1974, entitled "Process Of Charging And Discharging A Metal Halogen Cell", and is herein incorporated by reference. In this patent, a bipolar electrode structure is described wherein a porous graphite member is cemented to a dense graphite member with conducting "carbonizable" cement. The cement may be composed of a number of materials, including phenol formaldehyde, which upon heating will at least partially be converted to carbon. The electrodes are cemented together by applying the cementing material at the contact place between the electrodes, and heating the electrodes sufficiently to carbonize the cement. Preferably the material resulting from this heat treating should contain as much carbon as possible to afford a good electrical contact. Accordingly, it is taught to mix the cementing material with carbon or graphite.

The third technique of joining graphite to graphite is described in U.S. Pat. No. 4,100,332, issued on July 11, 1978, entitled "Comb Type Bipolar Electrode Elements And Battery Stacks Thereof", and is herein incorporated by reference. In this patent, it is taught to provide for a press or interference fit between the graphite electrodes and the graphite bus-bar wall. Accordingly, the electrodes are constructed slightly thicker than the grooves in the bus-bar, so that when pressed in they may be retained by a pressure fit. It is also stated that the electrodes may be connected to the bus-bar by cementing, plasma spraying at the point of contact, or welding.

The present invention provides a novel method of joining graphite to graphite which results in a low transition or contact resistance. Particularly, the method comprises: interposing a thermally sensitive material between the graphite members to be joined, applying pressure forcing the graphite members together, applying sufficient heat to the graphite members to melt the thermally sensitive material, and providing a period of time for cooling before releasing the applied pressure. The thermally sensitive material may be composed of any suitable plastic, metal, or ceramic material generally having a low melting point or glass transition temperature. Preferably, the thermally sensitive material is composed of a thermoplastic material, such as polyvinyl chloride, in the form of a powder. The heating may be provided by any suitable means, preferably resistance brazing. An important feature of the present invention is that the thermally sensitive material need not be heated to the point where it undergoes destruction or carbonization. It need only be heated to the point where the material enters the liquid phase so that it may distribute throughout the joint being formed and the pores of the graphite surfaces by capillary action. Since graphite is thermally quite stable (it sublimes at approximately 6600° F.), a wide variety of materials may be used for the thermally sensitive bonding material. However, thermoplastic materials are preferred due to their generally low melting points and low cost. It has been found that when thermoplastic material is resistance brazed to graphite, an acceptably low transition or contact resistance on the order of 0.5 milli-ohms/cm$^2$ may be achieved.

Other features and advantages of the present invention will become apparent in view of the drawings and the following detailed description of the preferred embodiments.

BRIEF DESCRIPTION OF THE DRAWINGS

FIG. 1 is a perspective view of a section of a zinc-chloride battery stack constructed in accordance with the present invention.

FIG. 2 is a perspective view of an electrode pair forming a portion of the battery stack of FIG. 1.

FIG. 3 is a side elevation view of a chlorine electrode structure of the electrode pair of FIG. 2, particularly illustrating the graphite to graphite connection in accordance with the present invention.

FIG. 4 is a schematic representation of an arrangement for resistance brazing graphite.

DETAILED DESCRIPTION OF THE PREFERRED EMBODIMENT

Referring to FIG. 1, a perspective view of a section of a zinc-chloride battery stack 10 is shown. Battery stack 10 is generally comprised of a plurality of electrode pairs 12, shown individually in FIG. 2, and a plastic frame 14. Each electrode pair 12 is comprised of a zinc electrode 16, a chlorine electrode structure 18, and a bus-bar 20 coupling the zinc electrode to the chlorine electrode structure. Chlorine electrode structure 18 includes a pair of chlorine electrode members 22 and 24 joined to a graphite frame 26. Zinc electrode 16 is preferably constructed from a dense or fine grained graphite, as exemplified by Union Carbide Corp. ATJ or EBP graphites. The zinc electrode also includes a tab portion 28 projecting from the top of the electrode to provide a surface area for connection to bus-bar 20.

Chlorine electrode members 22 and 24 are preferably constructed from liquid-permeable but gas-impermeable porous graphite, as exemplified by Union Carbide Corp. PG-60 or Airco Speer 37-G graphite. Graphite frame 26 is also preferably constructed from dense graphite, and serves to separate the two chlorine electrode members and acts as an electrical conduit. This graphite frame is comprised of top leg 26a and a side leg 26b at each end of the chlorine electrode structure. The graphite frame also includes a tab portion 29 which is used to electrically connect chlorine electrode structure 18 to the bus-bar 20.

A detailed description of the connection between bus-bar 20 and zinc electrode 16 and chlorine electrode structure 18 is set forth in a co-filed U.S. patent application entitled "A Method Of Joining Metal To Graphite", assigned to the assignee of the present invention, and is herein incorporated by reference. Bus-bar 20 is preferably constructed from titanium due to its mechanical strength, electrical conductivity, and resistance to chemical corrosion in the zinc-chloride battery environment. This bus bar serves as a current collector and connects adjacent cells of battery stack 10 electrically in series. Current sharing is facilitated between the cells arranged in parallel by a clip-on titanium strip 30, which is used to connect bus-bars of the same polarity together. At each end of battery stack 10, a set of conduits 32 is connected to the tab portion of the end cells. These conduits lead to an external battery terminal on each side of the battery stack for connection to a power supply for charging the battery or a load for discharging the battery.

Plastic frame 14 is preferably constructed from thermoplastic resins which are chemically resistant to the zinc-chloride battery environment, as exemplified by General Tire & Rubber Corp. Boltron polyvinyl chloride (4008-2124), Dupont Teflon (tetrafluorinated ethylene), and Pennwalt Kynar (polyvinylidene fluoride). Plastic frame 14 serves to align and separate electrode pairs 12, and provides a means to convey the electrolyte to chlorine electrode structure 18. The chlorine electrode structure is open at the bottom between electrode members 22 and 24 to receive electrolyte, as graphite frame 26 does not include a bottom leg. Graphite frame 26 may also be provided with one or more notches 34 (shown in FIG. 3) to permit any gas that may be present between chlorine electrode members 22 and 24 to escape.

Referring to FIG. 3, a side elevation view of chlorine electrode structure 18 is shown, particularly illustrating a graphite to graphite connection in accordance with the present invention. Chlorine electrode members 22 and 24 are joined or bonded to the sides of graphite frame 26 in the following manner. A first layer 36 of a thermally sensitive material is interposed between chlorine electrode member 22 and graphite frame 26, and a second layer 38 of the thermally sensitive material is interposed between chlorine electrode member 24 and graphite frame 26. The thickness of layers 36 and 38 are exaggerated in FIG. 3 for illustrative purposes. Pressure is then applied to the exterior surfaces of chlorine electrode members 22 and 24 forcing the electrode members together toward graphite frame 26. Then, sufficient heat is applied to the chlorine electrode members to melt the thermally sensitive material so that it may distribute throughout the joint being formed and the pores of the graphite surfaces by capillary action. Thereafter, a period of time for cooling is provided to permit the thermally sensitive material to solidify before releasing the pressure from chlorine electrode members 22 and 24.

Since graphite is thermally quite stable (it sublimes at approximately 6600° F.), a wide variety of materials may be used for the thermally sensitive bonding material. The particular application and the chemical environment intended for the graphite to graphite bond will, in general, control the selection of the appropriate thermally sensitive material. The thermally sensitive material may be composed of any suitable plastic, metal, or ceramic, preferably having a low melting point or glass transition temperature. As, plastics have the lowest melting points or glass transition temperatures, they are the most preferred material, even though plastics characteristicly have a high electrical resistivity. It has been found that an acceptably low transition or contact resistance may be achieved when plastic is employed for the thermally sensitive material. For example, a transition resistance of 0.5 milli-ohms/cm$^2$ was achieved with Kynar employed for the thermally sensitive material. Other plastics may also be suitable, such as Boltron polyvinyl chloride, Teflon, polypropylene, and polyethylene, and so forth.

The heating for melting the thermally sensitive material may be provided by conventional means, such as by heated platens contacting the exterior surfaces of chlorine electrode members 22 and 24. However, resistance brazing techniques are preferred, due at least in part to the rapid decrease in heat which occurs after the flow of electrical current has ceased. Several resistance brazing techniques are described in Volume 6, Welding And Brazing, of the Metals Handbook, Eighth Edition, 1971, by The American Society for Metals, and is herein incorporated by reference. Resistance brazing ordinarily is performed with conventional resistance welding equipment. However, heating and cooling times are generally longer, and the applied force is lower for resistance brazing than for resistance spot welding.

Referring to FIG. 4, a schematic representation of an arrangement 40 for resistance brazing graphite is illustrated. Interposed between graphite members 42 and 44 is a layer 46 of a thermally sensitive material. The thickness of layer 46 is exaggerated for illustrative purposes. Graphite member 44 is positioned upon a plate or mandrel 48, and an electrode 50 is positioned upon a top exterior surface 52 of graphite member 42. Mandrel 48 and electrode 50 are connected to a transformer 54 via electrical conduits 56 and 58. Transformer 54 is adapted to produce a sufficiently high electrical current to melt thermally sensitive material 46. The electrical current flows through electrode 50, graphite member 42, layer 46 of the thermally sensitive material, graphite member 44, and mandrel 48. The heat for the resistance brazing is obtained from the resistance to this flow of electrical current. The pressure required for establishing electrical contact across the joint is ordinarily applied through electrode 50 and mandrel 48. This pressure also assists in distributing the thermally sensitive material throughout the joint by capillary action as the material begins to melt or pass its glass transition temperature.

It should be appreciated by one skilled in the art that various graphite materials may be joined together in accordance with the present invention. Thus, dense graphite may be joined to dense graphite or porous graphite, and porous graphite may also be joined to porous graphite. Additionally, graphite oil foil materials, such as Union Carbide Corp. Graphfoil, may be joined to each other or any of the other graphite materials described above.

EXAMPLE

Dense graphite has been joined to dense graphite in the following manner. Two ATJ grade graphite members were sandblasted with fine grained sand to increase the surface area of the surfaces to be joined. However, it should be noted that other known surface preparation techniques for increasing the surface area may also be employed. A uniform layer of Kynar power (301) was applied to the joining surface of one of the graphite members. The quantity of Kynar used was in the range of 3–8 mg/cm$^2$. The other graphite member was then positioned on the layer of Kynar. A pressure of 50 kg/cm$^2$ was then applied to the graphite members forcing them together. A conventional welding machine (Kemppi PHS2) was then used to resistance braze the graphite members, and a brazing surface of 3 cm$^2$ was employed for each resistance braze. An electrical current of 5000–6000 amps was passed through the graphite members for 2.5 seconds. The period of time for cooling was 20 seconds before the pressure was released.

It will be appreciated by those skilled in the art that various changes and modifications may be made to the method and structure described in this specification without departing from the spirit and scope of the invention as defined by the appended claims. For example, the amount of thermally sensitive material, the pressure applied, amount of heat, and period of cooling are dependent upon the selection and dimensions of the materials selected. The various embodiments which have been set forth are for the purpose of illustration and were not intended to limit the invention.

What is claimed is:

1. A method of joining together a plurality of graphite plates providing a low transition resistance, comprising the steps of:
    (a) interposing a layer of thermally sensitive plastic material between said graphite plates;
    (b) applying a predetermined amount of pressure to said graphite plates forcing said graphite plates together;
    (c) applying sufficient heat to said graphite plates to melt said layer of thermally sensitive plastic material;
    (d) providing a predetermined period of time for cooling after said layer of thermally sensitive plastic material is melted; and
    (e) releasing said application of pressure to said graphite plates.

2. The method according to claim 1, wherein said thermally sensitive plastic material is a thermoplastic material.

3. The method according to claim 2, wherein said thermoplastic material is in the form of a powder.

4. The method according to claim 3, wherein said layer of thermoplastic power is sufficient to uniformly cover a joining surface between said graphite plates.

5. The method according to claim 1, wherein said application of heat is provided by resistance brazing.

6. The method according to claim 1, wherein said period of time for cooling is sufficient to permit said thermally sensitive material to solidify.

7. The method according to claim 1, wherein said graphite plates are manufactured from dense graphite.

8. The method according to claim 1, wherein one of said graphite plates is manufactured from porous graphite.

9. The method according to claim 1, wherein said joining surface constitutes only a portion of said plates.

10. The method according to claim 1, further including the step of sandblasting said graphite plates before the application of said thermally sensitive plastic material.

11. A method of joining a plurality of graphite plates to a graphite frame interposed between said graphite plates to form an electrode structure having a low transition resistance, each of said graphite plates having a joining surface portion and an exterior opposing surface, and said graphite frame having a first and second opposing mating side, comprising the steps of:
    (a) applying a first layer of a thermally sensitive plastic material to said joining surface portion of a first graphite plate;
    (b) positioning said first mating side of said graphite frame to rest upon said first layer of thermally sensitive plastic material over said joining surface portion of said first graphite plate;
    (c) applying a second layer of said thermally sensitive plastic material to said second mating side of said graphite frame;
    (d) positioning said joining surface portion of a second graphite plate to rest upon said second layer of thermally sensitive plastic material over said second mating side of said graphite frame;
    (e) applying a predetermined amount of pressure to said exterior surfaces of said graphite plates forcing said joining surface portions and said mating sides of said graphite plate together;
    (f) applying sufficient heat to said graphite members to melt said layers of thermally sensitive plastic material;
    (g) providing a predetermined period of time for cooling after said layers of thermally sensitive plastic material have been melted; and
    (h) releasing said electrode structure from said application of pressure.

12. A method of resistance brazing a plurality of graphite plates, comprising the steps of:
    (a) applying a predetermined quantity of thermally sensitive plastic material to a first graphite plate;
    (b) positioning a second graphite plate to rest upon said layer of thermally sensitive plastic material;
    (c) applying a predetermined amount of pressure to said graphite plates forcing said graphite plates together;
    (d) passing sufficient electrical current through said first graphite plate, said layer of thermally sensitive plastic material, and said second graphite plate to melt said thermally sensitive plastic material;
    (e) providing a period of time for cooling after said thermally sensitive plastic material has been melted; and
    (f) releasing said application of pressure from said graphite plates.

13. A composite structure, comprising: a plurality of graphite plates bonded together by a layer of thermally sensitive plastic material interposed between said graphite plates, said thermally sensitive plastic material having been melted and joined to said graphite plates by capillary action.

14. A method of joining together a plurality of graphite members providing a low transition resistance, comprising the steps of:
   (a) interposing a layer of thermally sensitive ceramic material between said graphite members;
   (b) applying a predetermined amount of pressure to said graphite members forcing said graphite members together;
   (c) applying sufficient heat to said graphite members to melt said layer of thermally sensitive ceramic material;
   (d) providing a predetermined period of time for cooling after said layer of thermally sensitive ceramic material is melted; and
   (e) releasing said application of pressure to said graphite members.

15. A method of joining together a plurality of graphite members providing a low transition resistance, comprising the steps of:
   (a) interposing a layer of thermally sensitive plastic powder between said graphite members;
   (b) applying a predetermined amount of pressure to said graphite members forcing said graphite members together;
   (c) applying sufficient heat to said graphite members to melt said layer of thermally sensitive plastic powder;
   (d) providing a predetermined period of time for cooling after said layer of thermally sensitive plastic powder is melted; and
   (e) releasing said application of pressure to said graphite members.

16. The method according to claim 15, wherein said layer of thermally sensitive plastic powder is sufficient to uniformly cover a joining surface between said graphite members.

17. The method according to claim 16, wherein said application of heat is provided by resistance brazing.